United States Patent [19]
Pravaz

[11] 3,963,199
[45] June 15, 1976

[54] CLOSING DEVICE FOR A PARACHUTE PACK

[75] Inventor: Marcel Pravaz, Clichy, France

[73] Assignee: Etudes et Fabrications Aeronautiques, Paris, France

[22] Filed: May 20, 1974

[21] Appl. No.: 471,705

[30] Foreign Application Priority Data
May 21, 1973  France .............................. 73.18397

[52] U.S. Cl. .............................. 244/148; 2/DIG. 6; 24/DIG. 18; 150/52 R
[51] Int. Cl.² ..................................... B64D 17/46
[58] Field of Search ......................... 244/147–149; 24/204, DIG. 18; 2/DIG. 6, 99; 150/7, 3, 52 R, 21, 15, 43, 42

[56] References Cited
UNITED STATES PATENTS

| | | | |
|---|---|---|---|
| 2,495,341 | 1/1950 | Moran | 244/148 |
| 2,519,923 | 8/1950 | Noelcke | 244/148 |
| 2,577,737 | 12/1951 | Brown | 244/148 |
| 3,196,459 | 7/1965 | Grazia | 24/204 X |
| 3,196,511 | 7/1965 | Kintner | 2/DIG. 6 |
| 3,203,551 | 8/1965 | Loan | 150/7 X |
| 3,295,577 | 1/1967 | Danielson | 150/52 R |
| 3,690,604 | 9/1972 | Guilfoyle | 244/148 |
| 3,703,268 | 11/1972 | Pravaz | 244/148 |
| 3,833,938 | 9/1974 | Shweid | 2/96 |

Primary Examiner—Trygve M. Blix
Assistant Examiner—Galen L. Barefoot

[57] ABSTRACT

The device comprises a first gripping band of the Velcro type which is secured to a first of the parachute pack flaps and engages a second gripping band of the Velcro type secured to a second pack flap opposite the first flap. The pack is opened by an opening control device which is connected through a flexible connecting element to an edge of the second gripping band in such manner that a pull on the opening control device causes the second gripping band to be disengaged by peeling off from the first gripping band in starting from the edge. In an alternative arrangement, the first and second gripping bands are interconnected not directly but by an independent gripping band which is disengaged by peeling off from the first and second gripping bands for opening the pack. The opening control device may be an automatic pack opening strap coiled on the pack.

11 Claims, 7 Drawing Figures

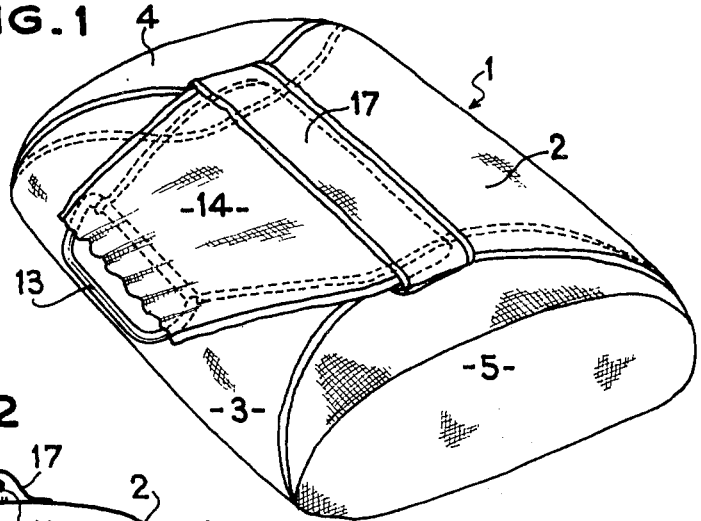
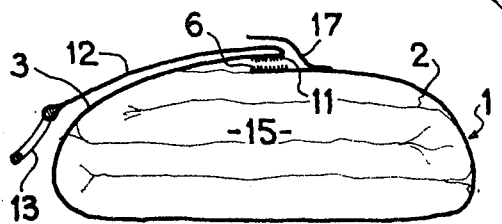
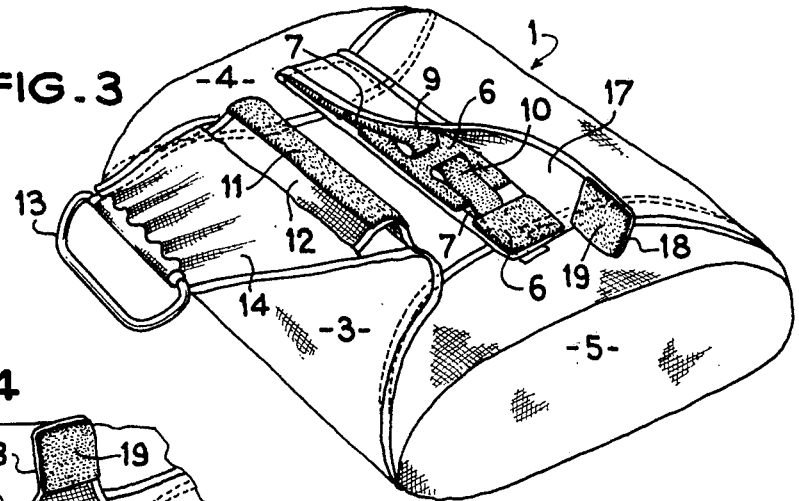
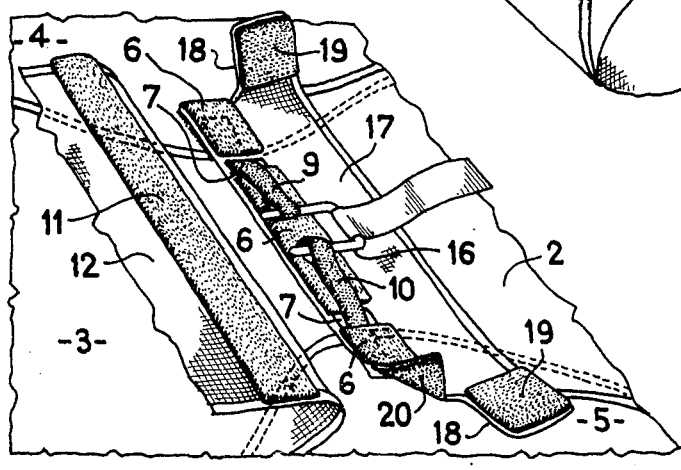

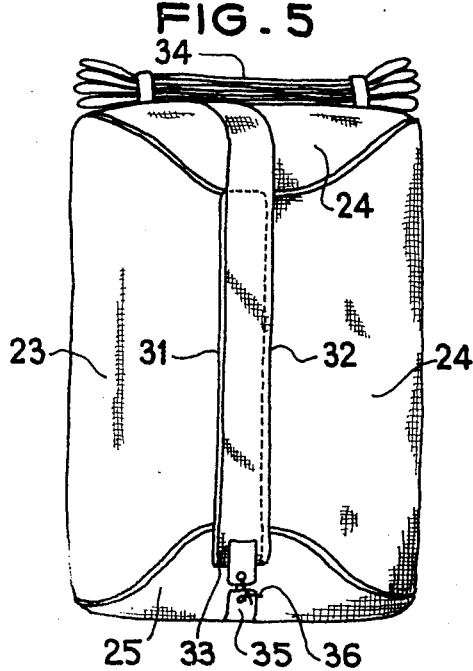
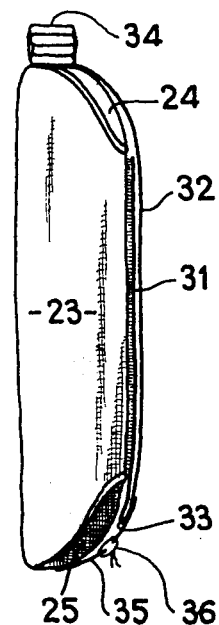
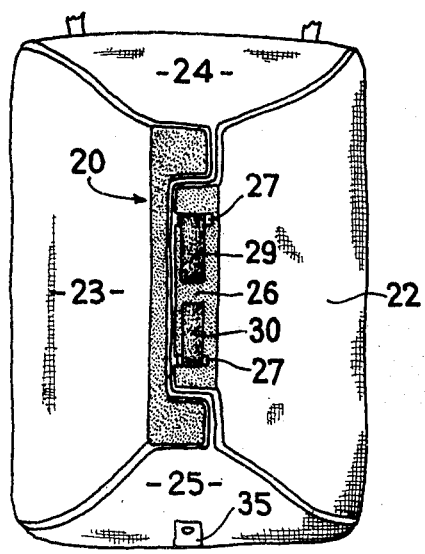

CLOSING DEVICE FOR A PARACHUTE PACK

The present invention relates to parachute packs and more particularly to closing devices for these packs.

Closing devices for parachute packs employing a controlled opening almost all comprise cones which are usually fixed to a metal plate provided on at least on flap of the pack and extend through eyelets provided on other flaps and are maintained in position by pins disposed in apertures in the cones, these pins being connected to a control or opening handle through a metal cable.

Such a closing device is relatively rigid and may be found to be uncomfortable in certain circumstances. Moreover, it is relatively complicated and costly to manufacture.

An object of the present invention is to provide a closing device for a parachute pack having a controlled opening which comprises no metal member, is flexible, reliable and efficient in operation and simple and cheap to manufacture.

The invention employs a particular property of systems employing gripping bands of known type constituted by two bands, one of which has open loops or curls constituting hooks and the other loops or curls, commercially available for example under the trademark "VELCRO".

When interengaged, these bands have an excellent resistance to separation when subjected to a pull exerted in a direction parallel to their planes, this resistance being still greater when a pressure tends to apply the bands against each other.

On the other hand, this resistance to separation is low when one of the bands is rolled back by folding it onto itself while maintaining the other band in its plane.

According to the invention, there is provided a parachute pack having flaps, at least two of which flaps comprise gripping bands, wherein means for controlling the opening of the pack are connected to one end of a flexible connecting element, the other end of the flexible connecting element being connected to an edge of a gripping band which ensures that the flaps are maintained in their pack-closing position and may be a gripping band of one of said flaps, said opening means being disposed, when the pack is closed on the opposite side of said flap-maintaining band with respect to said edge of said flap-maintaining band so that the connecting element is folded at 180° onto said flap-maintaining band around said edge of said flap-maintaining band.

According to one embodiment of the invention, a first of the flaps has a first gripping band on an edge portion of its outer face, a second flap opposite the first flap being extended by an elongated tab which constitutes said connecting element and is folded at 180°, said opening control means being connected to an end of said elongated tab, a second gripping band which is complementary to the first gripping band being fixed to the inner face of said second flap so as to coincide, in the closed position of the pack, with the first gripping band of the first flap.

Preferably, the tab is maintained applied along said flap by a keeper which defines with the latter a guide passage at the outer end of which the opening control means extends.

In another embodiment, the gripping band of said first flap has two transverse spaced-apart slots through which extend two gripping bands integral with two intermediate flaps of the pack so that the gripping band ensuring the closure of the pack co-operates at the same time with the bands of the first flap and of the intermediate flaps.

In a modification of the invention, the four flaps of a pack have tabs adapted to be exposed in the same plane when they are in the pack-closing position and together constitute a surface of gripping band against which there is applied an independent complementary gripping band which is connected to a connecting element at an end of the independent gripping band remote from the opening control means.

Advantageously, in this case, the opening control means is constituted by an automatic opening strap.

Embodiments of the invention will now be described by way of examples with reference to the accompanying drawings in which:

FIG. 1 is a perspective view of a preferred embodiment of a parachute pack to which the invention is applied, the pack being in the closed position;

FIG. 2 is a cross-sectional view taken on line 2—2 of FIG. 1;

FIG. 3 is a perspective view of the pack shown in FIG. 1, partly opened, so as to show the arrangement of the gripping bands and flexible connecting element;

FIG. 4 is a partial perspective view of the pack in the course of its closure;

FIG. 5 is a plan view of an automatically-opened parachute pack;

FIG. 6 is a side elevational view of the pack shown in FIG. 5 showing the arrangement of the automatic opening strap and connecting element, and FIG. 7 is a view similar to FIG. 5, the pack-closing gripping band having been removed.

In the embodiment shown in FIGS. 1 to 4, the parachute pack 1 to which the invention is applied is of conventional type comprising four closing flaps, namely two main flaps 2, 3 and two intermediate flaps 4, 5.

The main flap 2 has at its end a gripping band 6 which is secured to the outer face of the flap alongside its edge.

Formed in the band 6 are two transverse slots 7 which are spaced apart and through which extend toward each other in opposite directions two tabs 9 and 10 constituted by gripping bands respectively fixed to edge portions of the intermediate flaps 4 and 5 which are folded over before the other two flaps and covered by the flap 2, each of these tabs 9, 10 having a loop at its free end.

The gripping bands of the tabs 9, 10 and the gripping band fixed to the edge portion of the flap 2 are of the same type, for example of the type having closed loops or curls.

The main flap 3 opposite the flap 2 has at its end a gripping band 11 secured alongside its edge on its inner face, this band being for example of the type having open loops or curls.

A tab 12 is secured to the outer edge of the gripping band 11 and extends the flap 3 so as to constitute a flexible connecting element to the free end of which there is secured a pulling means for opening the pack which is a metal handle 13 known per se.

By way of a modification and in an advantageous manner, the flap 3 is extended beyond the gripping band 11 and this extension constitutes the connecting element 12.

A piece of fabric 14 constituting a wide keeper is sewn alongside opposite edges to the outer face of the flap 3 and defines with the latter a passage through which the connecting element 12 extends.

Advantageously, the end of this passage is slightly constricted so as to contain and retain the opening control handle 13 in the known manner.

When the canopy 15 is folded up and disposed in the pack, to close the pack, the intermediate flaps 4 and 5 are folded over and then the flap 2 is folded over on top of the flaps 4 and 5, the tabs 9 and 10 being passed through the slots 7.

In order to hold the flaps 4 and 5 in position during the closure of the pack, there is advantageously employed a U-shaped member of metal 16, the branches of which are engaged in the end loops of the tabs 9 and 10 as shown in FIG. 4.

The flap 3 is then folded over and the gripping band 11 is applied against the gripping band 6 and the gripping bands of the tabs 9 and 10 and the member 16 is withdrawn and the flaps are thus held firmly assembled.

The tab 12 constituting the connecting element between the handle 13 and the edge of the gripping band 11 remote from the handle in the closed position of the pack is then extended through the passage formed on the flap 3 and the length of the connecting element 12 is just a little greater than the distance between the handle 13 and the outer edge of the band 11 for safety reasons.

It will be understood that when the pulling means or handle 13 is pulled, the outer edge of the gripping band 11 is raised and turned over and pulled rearwardly approximately in the same plane and is easily separated from the gripping bands of the other flaps. The pack is then freely opened by the action of elastically-yieldable means disposed in the pack in the known manner.

Preferably, the closing structure of the pack is covered and protected by a covering band 17 which is secured to the flap 2 and is parallel to the gripping band 6, this band 17 having ear portions 18 provided with portions 19 of a gripping material which are adapted to be folded laterally under end portions of the flap 2 and engaged with portions 20 which are also provided with a co-operating gripping material on the inner face of the flap 2.

This very simple and cheaply manufactured closing device eliminates all metal parts and is very thin and very flexible, the closed pack being deformable without affecting its closing device in any way.

It will be observed that when the canopy 15 is enclosed in the pack, it exerts pressure on the flaps and tends to apply them against each other.

Owing to these advantageous features, the device according to the invention permits the construction of special packs for parachutes, for example for a certain type of gliders in which the pilot is in an almost lying-down position on a special seat.

In this case, a conventional parachute pack is extremely uncomfortable and longer and therefore thinner parachute packs have been envisaged. However, in this case, the metal parts of the conventional closing devices are uncomfortable.

The device according to the invention permits the construction of an elongated thin parachute pack constituting a kind of mattress which is very comfortable for the pilot and was heretofore impossible.

The invention is also applicable to parachute packs which are automatically opened by a strap. FIGS. 5, 6 and 7 show the invention in this application.

In this case, the four pack flaps 22, 23, 24 and 25 have portions thereof covered with pieces of gripping bands which, when grouped together, define an elongated surface 20 (FIG. 7), the lateral flaps 24, 25 including tabs 29, 30 which pass through slots 27 provided in the gripping band 26 on the flap 22 as in the arrangement of the foregoing embodiment.

Advantageously, the edges of the flaps 22 and 23 have complementary shapes in accordance with any suitable arrangement, for example that shown in FIG. 7.

A separate gripping band 31 is then applied against the surface 20, this band 31 being connected at one end 33 to an automatic opening strap 32 which is folded onto itself at roughly its connection 33 to the band 31 and is coiled in the conventional manner at 34 on the pack. The part 34 of the strap 32 may be termed the pulling means for opening the pack and the part of the strap 32 extending from the part 34 to the connection 33 may be termed a connecting element connecting the part 34 to the connection 33.

For safety purposes, the connection 33 is connected to a tab portion 35, secured to the pack, by a thread or wire 36 adapted to snap upon application of a predetermined tensile force thereon.

It will be understood that when the automatic opening strap is pulled taut from the part 34, the band 31 is easily separated from the surface 20 after the wire or thread 36 has snapped, this band being progressively pulled back as it is folded onto itself.

Note that the device acording to the invention may be arranged with a pack-opening control handle disposed either directly thereon or on a chest strap of the harness.

In the latter case, it is sufficient to provide an extension of the passage in which the connecting element slides, for example by means of a piece of fabric secured to the flap to which the piece of fabric 14 is secured, the fabric 14 itself and the connecting element being extended in a corresponding manner.

The pack may also be closed by means of a separate gripping band as described hereinbefore with reference to FIGS. 5 to 7, a handle being connected to the end 33 of the band 31 instead of the end of the automatic opening strap 32.

Having now described my invention what I claim as new and desire to secure by letters patent is:

1. A closing device for a parachute pack having pack-closing flaps which are capable of moving apart from each other from a pack-closing position to a position in which the flaps define an opening in the pack through which opening the parachute can emerge from the pack, said device comprising first and second gripping bands respectively secured to at least two opposed flaps of the pack, gripping band means for maintaining said first and second gripping bands assembled in a pack-closing position by attachment of the gripping band means to said first and second gripping bands, the gripping band means having an edge by which the gripping band means is to be progressively detached by peeling off from said first and second gripping bands in starting at said edge, pulling means for controlling the opening of the pack by a pull exerted on the pulling means substantially in a given direction, a flexible connecting element having one end connected to the pulling means and an opposite end connected to said edge of the gripping band means, the pulling means being disposed on the opposite side of the gripping band means to said edge and the flexible connecting element being folded at 180° around said edge and extending in a direction which is substantially said given direction in overlapping relation to the gripping band means from said edge to said pulling means when the closing device is operative to close the pack.

2. A closing device for a parachute pack having pack-closing flaps which are capable of moving apart from each other from a pack-closing position to a position in which the flaps define an opening in the pack through which opening the parachute can emerge from the pack, said device comprising a first gripping band secured to an outer face of a first of said flaps adjacent a free edge of the first flap, a second gripping band secured to an inner face of a second of said flaps which is opposite said first flap, the second gripping band being complementary to the first gripping band and overlapping the first gripping band in a position of the first and second flaps corresponding to a closed pack, the second gripping band having an edge by which edge the second gripping band is to be detached by peeling off from the first gripping band in starting from said edge, a flexible elongated tab integral with and extending the second flap from said edge of the second gripping band to and outer end of the tab, pulling means connected to said outer end of the tab for opening the pack by a pull exerted on the pulling means substantially in a given direction, the tab being, when the closing device is operative to close the pack, folded over at 180° around said edge of the second gripping band and extending in a direction which is substantially said given direction in overlapping relation to the second gripping band from said edge to said pulling means, the pulling means being disposed on the opposite side of the second gripping band to said edge.

3. A device as claimed in claim 2, wherein said first and second gripping bands are complementary and include interengageable hooks and loops, for example of the "Velcro" type.

4. A closing device for a parachute pack having pack-closing flaps, said device comprising a first gripping hand secured to an outer face of a first of said flaps adjacent a free edge of the first flap, a second gripping band secured to an inner face of a second of said flaps which is opposite said first flap, the second gripping band being complementary to the first gripping band and overlapping the first gripping band in a position of the first and second flaps corresponding to a closed pack, the second gripping band having an edge by which edge the second gripping band is to be detached by peeling off from the first gripping band in starting from said edge, a flexible elongated tab integral with and extending the second flap from said edge of the second gripping band to an outer end of the tab, a pack opening control means connected to said outer end of the tab, the tab being, when the closing device is operative to close the pack, folded over 180° around said edge of the second gripping band and extending in overlapping relation to the second gripping band from said edge to said opening control means, the opening control means being disposed on the opposite side of the second gripping band to said edge, means defining a keeper which defines with said first flap a guiding passage in which said tab extends from said edge, the passage having an outer end through which outer end the opening control means extends.

5. A closing device for a parachute pack having pack-closing flaps, said device comprising a first gripping band secured to an outer face of a first of said flaps adjacent a free edge of the first flap, a second gripping band secured to an inner face of a second of said flaps which is opposite said first flap, the second gripping band being complementary to the first gripping band and overlapping the first gripping band in a position of the first and second flaps corresponding to a closed pack, the second gripping band having an edge by which edge the second gripping band is to be detached by peeling off from the first gripping band in starting from said edge, a flexible elongated tab integral with and extending the second flap from said edge of the second gripping band to an outer end of the tab, a pack opening control means connected to said outer end of the tab, the tab being, when the closing device is operative to close the pack, folded over at 180° around said edge of the second gripping band and extending in overlapping relation to the second gripping band from said edge to said opening control means, the opening control means being disposed on the opposite side of the second gripping band to said edge, two opposed intermediate flaps of said flaps of the pack, gripping bands respectively secured to and extending the two intermediate flaps, means defining two spaced apart transverse slots in the first gripping band, the gripping bands of the two intermediate flaps respectively extending through the two slots and being complementary to the second gripping band, the second gripping band overlapping and engaging the first gripping band and the gripping bands of the intermediate flaps for maintaining the first and second and the intermediate flaps in a pack-closing position.

6. A closing device for a parachute pack having pack-closing flaps, said device comprising a first gripping band secured to an outer face of a first of said flaps adjacent a free edge of the first flap, a second gripping band secured to an outer face of a second of said pack flaps adjacent a free edge of the second flap, the second flap being opposite the first flap, third gripping band and a fourth gripping band respectively secured to and extending from a third and a fourth opposite intermediate flaps of said pack flaps, the first, second, third and fourth gripping bands lying substantially in a common plane in a pack-closing position of the first, second, third and fourth flaps and constituting together a gripping surface, a fifth gripping band complementary to and overlapping and engaging the first, second, third and fourth gripping bands, the fifth gripping band having an edge by which edge the fifth gripping band is to be detached by peeling off from the first, second, third and fourth gripping bands in starting from said edge, a flexible elongated connecting element having a first end connected to said edge of the fifth gripping band and an opposite second end, pack-opening control means connected to said second end of the connecting element, the connecting element being folded at 180° around said edge of the fifth gripping band and extending in overlapping relation to the fifth gripping band from said edge to said opening control means, the opening control means being disposed on the opposite side of the fifth gripping band to said edge when the closing device is operative to close the pack.

7. A device as claimed in claim 6, comprising, means defining two transverse spaced-apart slots in the first gripping band, the fourth and fifth gripping bands respectively extending through the two slots for direct engagement with the fifth gripping band.

8. A device as claimed in claim 7, wherein the opening control means comprises an automatic pack-opening strap.

9. A device as claimed in claim 7, wherein the opening control means is a handle mounted relative to the pack to be pulled in a direction for folding the fifth gripping band onto itself and peeling it off the first, second, third and fourth gripping bands.

10. A device as claimed in claim 6, wherein the fifth gripping band is complementary to the first, second, third and fourth gripping bands and the bands include interengageable hooks and loops, for example of the "Velcro" type.

11. A back parachute pack intended to be employed by a pilot in a lying-down position, arranged in such manner as to cover substantially the whole of the back and small of the back of the pilot and constitute a thin mattress, the pack having pack-closing flaps which are capable of moving apart from each other from a pack-closing position to a position in which the flaps define an opening in the pack through which opening the parachute can emerge from the pack and a device for closing the pack comprising first and second gripping bands respectively secured to at least two opposed flaps of the pack, gripping band means for maintaining said first and second gripping bands assembled in a pack-closing position by attachment of the gripping band means to said first and second gripping bands, the gripping band means having an edge by which the gripping band means is to be progressively detached by peeling off from said first and second gripping bands in starting at said edge, pulling means for controlling the opening of the pack by a pull exerted on the pulling means substantially in a given direction, a flexible connecting element having one end connected to the pulling means and an opposite end connected to said edge of the gripping band means, the pulling means being disposed on the opposite side of the gripping band means to said edge and the flexible connecting element being folded at 180° around said edge and extending in a direction which is substantially said given direction in overlapping relation to the gripping band means from said edge to said pulling means when the closing device is operative to close the pack.

* * * * *